(12) United States Patent
Chu

(10) Patent No.: US 11,863,097 B2
(45) Date of Patent: Jan. 2, 2024

(54) MOTOR CONTROLLER

(71) Applicant: Global Mixed-mode Technology Inc., Hsin-Chu (TW)

(72) Inventor: Chien-Lun Chu, Hsinchu County (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 162 days.

(21) Appl. No.: 17/709,436

(22) Filed: Mar. 31, 2022

(65) Prior Publication Data

US 2023/0318509 A1 Oct. 5, 2023

(51) Int. Cl.
*H02P 27/08* (2006.01)

(52) U.S. Cl.
CPC .................. *H02P 27/085* (2013.01)

(58) Field of Classification Search
CPC .............................. H02P 27/08; H02P 27/085
See application file for complete search history.

(56) References Cited

U.S. PATENT DOCUMENTS

| 2017/0054391 A1* | 2/2017 | Qian ....................... H02P 27/08 |
| 2021/0075348 A1 | 3/2021 | Chen |
| 2022/0166359 A1* | 5/2022 | Yang ....................... H02P 27/08 |

FOREIGN PATENT DOCUMENTS

| TW | 201242235 A1 | 10/2012 |
| TW | I749948 B | 12/2021 |

* cited by examiner

*Primary Examiner* — Cortez M Cook
(74) *Attorney, Agent, or Firm* — Winston Hsu

(57) ABSTRACT

A motor controller comprises a switch circuit, a driving circuit, and a pulse width modulation circuit. The switch circuit is coupled to a three-phase motor for driving the three-phase motor. The driving circuit generates a plurality of control signals to control the switch circuit. When the motor controller starts a floating phase for detecting a phase switching time point, the motor controller enables that at least one transistor within the switch circuit is operated in a linear region. The motor controller is configured to reduce switching noise of the three-phase motor and increase a success rate of phase switching.

40 Claims, 2 Drawing Sheets

MOTOR CONTROLLER

BACKGROUND OF THE INVENTION

1. Field of the Invention

The present invention relates to a motor controller, and more particularly, to a motor controller which may be applied to a three-phase sensorless motor.

2. Description of the Prior Art

Conventionally, there are two driving methods for driving a three-phase motor. The first driving method uses the Hall sensor for switching phases, so as to drive the three-phase motor. The second driving method does not use the Hall sensor to drive the three-phase motor. The Hall sensor is affected by the external environment easily, such that the detecting accuracy is decreased. Besides, the installation of the Hall sensor results in an increase of the volume and the cost of the system. Therefore, the sensorless driving method is provided for solving the above problems.

In the sensorless driving method, the motor controller detects the back electromotive force of the floating phase for switching phases, so as to drive the three-phase motor. However, when the motor controller detects the back electromotive force during a floating phase time interval, a transistor must be kept turning ON/OFF states in the other two phases, which results that the three-phase motor generates switching noise. Such switching noise affects the detecting accuracy and decreases the success rate of switching phases.

Furthermore, when the motor controller utilizes an ON time interval of a pulse width modulation signal to detect a phase switching time point, if the ON time interval is too small, it may result that the voltage of the floating phase pin is unstable and the back electromotive force is difficult to detect. Thus, the designer may adopt an ON time detecting mode and an OFF time detecting mode to detect the back electromotive force. However, when the motor controller switches between the two detecting modes, it may cause that the zero points detected by monitoring the back electromotive force are different. Also, such detecting method results that the motor controller cannot be applied to a high frequency configuration.

SUMMARY OF THE INVENTION

According to the present invention, a motor controller which is capable of reducing switching noise of a three-phase motor and increasing a success rate of switching phases is provided. The motor controller is configured to drive the three-phase motor. The motor controller comprises a switch circuit, a driving circuit, and a pulse width modulation circuit. The switch circuit is coupled to the three-phase motor, where the switch circuit comprises a first transistor, a second transistor, a third transistor, a fourth transistor, a fifth transistor, a six transistor, a first terminal, a second terminal, and a third terminal. The first transistor and the second transistor are coupled to the first terminal. The third transistor and the fourth transistor are coupled to the second terminal. The fifth transistor and the sixth transistor are coupled to the third terminal. The driving circuit is configured to generate a plurality of control signals to control the switch circuit. The pulse width modulation circuit is configured to generate a pulse width modulation signal to the driving circuit, where the pulse width modulation signal has a duty cycle. When the motor controller starts a floating phase for detecting a phase switching time point, the motor controller enables that the first transistor is partially turned on. The motor controller enables that the second transistor is partially turned on. The motor controller enables that the third transistor is turned off or partially turned on. The motor controller enables that the fourth transistor is partially turned on or fully turned on. The motor controller enables that the fifth transistor and the sixth transistor are turned off. The motor controller modulates an ON resistance of the first transistor and an ON resistance of the second transistor. The motor controller does not need to start an ON time detecting mode or an OFF time detecting mode for detecting a back electromotive force. The switch circuit further comprises a fourth terminal and a fifth terminal. The first transistor, the third transistor, and the fifth transistor are coupled to the fourth terminal. The second transistor, the fourth transistor, and the sixth transistor are coupled to the fifth terminal. The motor controller detects a zero point of a back electromotive force by comparing a voltage of the third terminal with a voltage of a sixth terminal during a floating phase time interval.

According to one embodiment of the present invention, when the motor controller starts a floating phase for detecting a phase switching time point, the motor controller may enable that at least one transistor within the switch circuit is operated in a linear region.

According to one embodiment of the present invention, when the motor controller starts a floating phase for detecting a phase switching time point, the motor controller may enable that a voltage of an output terminal within the switch circuit is greater than a ground voltage and the voltage of the output terminal is less than an input voltage. The input voltage may be a power supply voltage.

According to one embodiment of the present invention, when the motor controller starts a floating phase for detecting a phase switching time point, the motor controller may be operated in a voltage lock mode or a current lock mode. When the motor controller is operated in the voltage lock mode, the motor controller may enable that a voltage of an output terminal within the switch circuit is locked at a specific voltage. The specific voltage is relevant to the duty cycle. When the duty cycle increases, the specific voltage increases. When the motor controller is operated in the current lock mode, the motor controller may enable that a current flowing through an output terminal within the switch circuit is locked at a specific current. The specific current is relevant to the duty cycle. When the duty cycle increases, the specific current increases.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
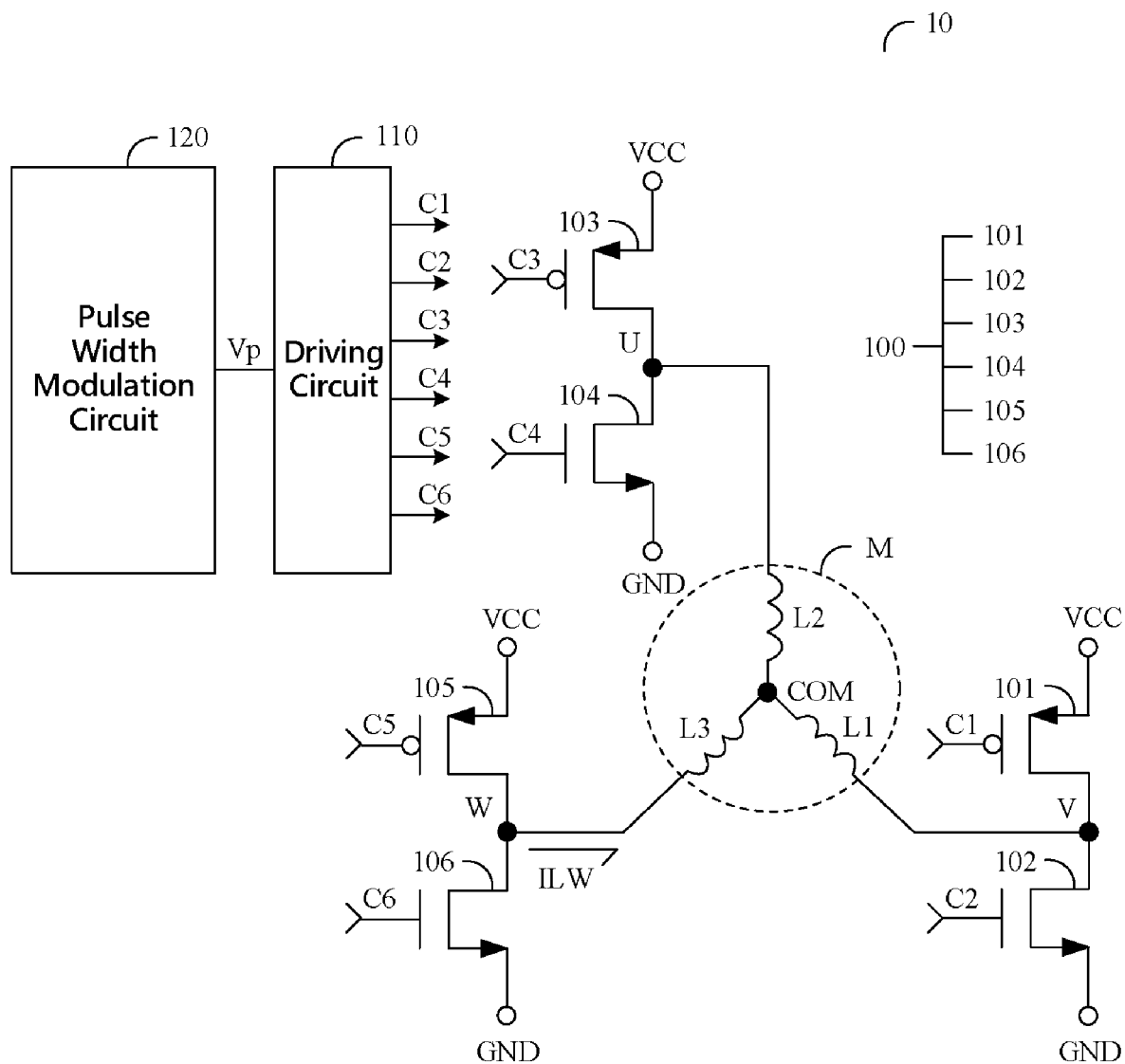
FIG. 1 is a schematic diagram showing a motor controller according to one embodiment of the present invention.

FIG. 1 is a schematic diagram showing a motor controller 10 according to one embodiment of the present invention. The motor controller 10 is used for driving a three-phase motor M, where the three-phase motor M has a first coil L1, a second coil L2, and a third coil L3. The motor controller 10 comprises a switch circuit 100, a driving circuit 110, and a pulse width modulation circuit 120. The switch circuit 100 includes a first transistor 101, a second transistor 102, a third transistor 103, a fourth transistor 104, a fifth transistor 105, a sixth transistor 106, a first terminal V, a second terminal U, a third terminal W, a fourth terminal VCC, and a fifth terminal GND, where the switch circuit 100 is coupled to the three-phase motor M for driving the three-phase motor M. The first terminal V has a first voltage signal VO. The second terminal U has a second voltage signal UO. The third terminal W has a third voltage signal WO. The first transistor 101 is coupled to the fourth terminal VCC and the first terminal V while the second transistor 102 is coupled to the first terminal V and the fifth terminal GND. The third transistor 103 is coupled to the fourth terminal VCC and the second terminal U while the fourth transistor 104 is coupled to the second terminal U and the fifth terminal GND. The fifth transistor 105 is coupled to the fourth terminal VCC and the third terminal W while the sixth transistor 106 is coupled to the third terminal W and the fifth terminal GND. Each of the first transistor 101, the third transistor 103, and the fifth transistor 105 may be a p-type MOSFET. Each of the second transistor 102, the fourth transistor 104, and the sixth transistor 106 may be an n-type MOSFET. Moreover, the fourth terminal VCC has an input voltage, where the input voltage may be a power supply voltage. The fifth terminal GND has a ground voltage. The system may provide the input voltage for the motor controller 10 via the fourth terminal VCC, thereby enabling the motor controller 10 to work normally. For example, the input voltage may be 12 volts and the ground voltage may be 0 volt. Therefore, the motor controller 10 may be applied to a high voltage configuration.

The first coil L1 is coupled to the first terminal V and a sixth terminal COM. The second coil L2 is coupled to the second terminal U and the sixth terminal COM. The third coil L3 is coupled to the third terminal W and the sixth terminal COM. That is to say, the first coil L1, the second coil L2, and the third coil L3 form a Y-shaped configuration. The driving circuit 110 generates a first control signal C1, a second control signal C2, a third control signal C3, a fourth control signal C4, a fifth control signal C5, and a sixth control signal C6 for respectively controlling the ON/OFF states of the first transistor 101, the second transistor 102, the third transistor 103, the fourth transistor 104, the fifth transistor 105, and the sixth transistor 106. The pulse width modulation circuit 120 generates a pulse width modulation signal Vp to the driving circuit 110, where the pulse width modulation signal Vp has a duty cycle. The motor controller 10 may control the speed of the three-phase motor M by adjusting the duty cycle.

Figure 2:
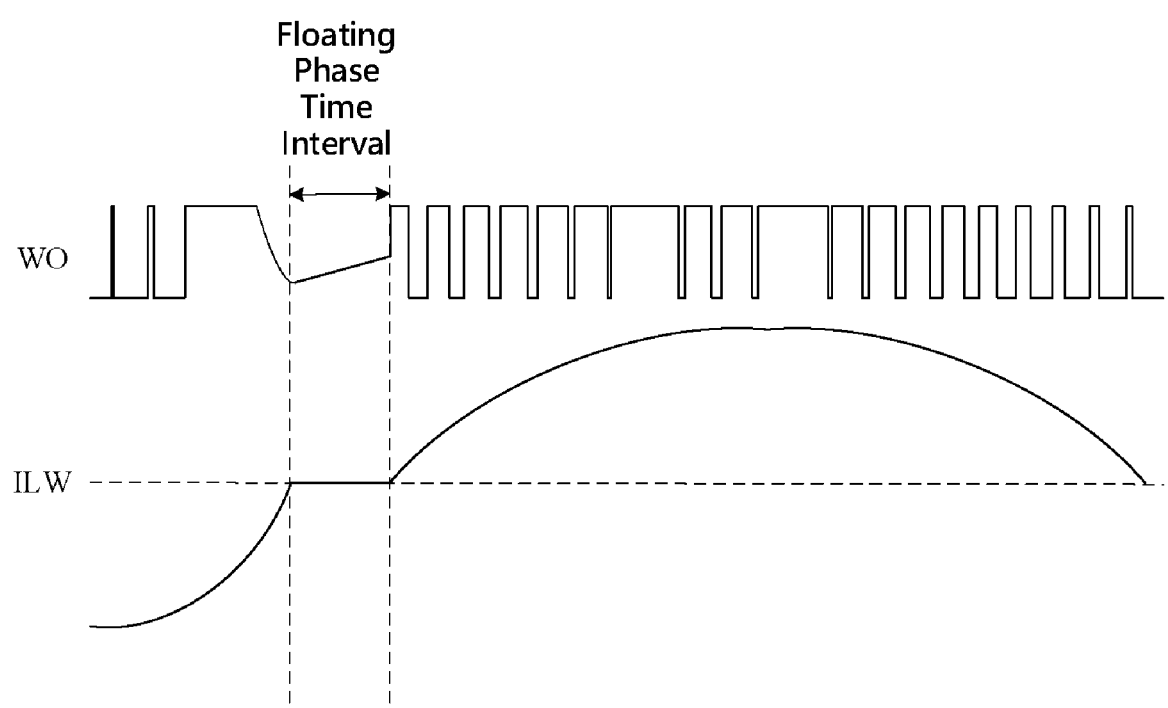
FIG. 2 is a timing chart according to one embodiment of the present invention.

FIG. 2 is a timing chart according to one embodiment of the present invention, where the current ILW indicates the current flowing through the third coil L3. Please refer to FIG. 1 and FIG. 2 simultaneously. According to one embodiment of the present invention, when the motor controller 10 starts a floating phase for detecting a phase switching time point, the motor controller 10 may enable that at least one transistor within the switch circuit 100 is operated in a linear region, where the floating phase is formed in the third coil L3. At this moment the motor controller 10 enables that the fifth transistor 105 and the sixth transistor 106 are turned off to form the floating phase. In order to avoid generating switching noise, when the motor controller 10 starts the floating phase for detecting the phase switching time point, the motor controller 10 may enable that the voltage of the first terminal V is greater than the ground voltage and the voltage of the first terminal V is less than the input voltage. More specifically, when the motor controller 10 starts the floating phase for detecting the phase switching time point, the motor controller 10 may enable that the voltage of the first terminal V is locked at a specific voltage or the current flowing through the first terminal V is locked at a specific current, according to the duty cycle of the pulse width modulation signal Vp. The specific voltage may be relevant to the duty cycle and the specific current may be relevant to the duty cycle. For instance, when the duty cycle is 50%, the input voltage is 12 volts and the ground voltage is 0 volt, the motor controller 10 may enable that the voltage of the first terminal V is locked at 6 volts. That is to say, if the motor controller 10 adopts a voltage lock mode, when the duty cycle increases, the specific voltage may increase. Similarly, if the motor controller 10 adopts a current lock mode, when the duty cycle increases, the specific current may increase. Thus, when the motor controller 10 starts the floating phase for detecting the phase switching time point, the motor controller 10 may reduce switching noise of the three-phase motor M and increase the success rate of switching phases by the voltage lock mode or the current lock mode. Furthermore, when the motor controller 10 starts the floating phase for detecting the phase switching time point, the motor controller 10 may not need to start an ON time detecting mode or an OFF time detecting mode for detecting aback electromotive force, resulting that the motor controller 10 may be applied to a high frequency configuration. When the motor controller 10 starts the floating phase for detecting the phase switching time point, the motor controller 10 may avoid generating switching noise and increase the detecting accuracy by the embodiments as follows:

1. When the motor controller 10 enables that the fifth transistor 105 and the sixth transistor 106 are turned off to form the floating phase, the floating phase is formed in the third coil L3. When the motor controller 10 enables that the floating phase is formed in the third coil L3, the motor controller 10 may enable that the first transistor 101 and the second transistor 102 are partially turned on. That is, both the first transistor 101 and the second transistor 102 are operated in the linear region. At this moment the motor controller 10 may enable that the third transistor 103 is turned off and the fourth transistor 104 is partially turned on or fully turned on. The motor controller 10 may modulate the ON resistance of the first transistor 101 and the ON resistance of the second transistor 102, such that the motor controller 10 enters the voltage lock mode or the current lock mode to avoid generating switching noise. As shown in FIG. 2, the motor controller 10 may detect the zero point of the back electromotive force by comparing the voltage of the third terminal W with the voltage of the sixth terminal COM during the floating phase time interval. Therefore, when the motor controller 10 starts the floating phase for detecting the phase switching time point, the motor controller 10 may not need to start the ON time detecting mode or the OFF time detecting mode for detecting the back electromotive force.

2. When the motor controller 10 enables that the fifth transistor 105 and the sixth transistor 106 are turned off to form the floating phase, the floating phase is formed in the third coil L3. When the motor controller 10 enables that the floating phase is formed in the third coil L3, the motor controller 10 may enable that the first transistor 101 and the second transistor 102 are partially turned on. That is, both the first transistor 101 and the second transistor 102 are operated in the linear region. At this moment the motor controller 10 may enable that the third transistor 103 is partially turned on and the fourth transistor 104 is partially turned on or fully turned on. The motor controller 10 may modulate the ON resistance of the first transistor 101 and the ON resistance of the second transistor 102, such that the motor controller 10 enters the voltage lock mode or the current lock mode to avoid generating switching noise. As shown in FIG. 2, the motor controller 10 may detect the zero point of the back electromotive force by comparing the voltage of the third terminal W with the voltage of the sixth terminal COM during the floating phase time interval. Therefore, when the motor controller 10 starts the floating phase for detecting the phase switching time point, the motor controller 10 may not need to start the ON time detecting mode or the OFF time detecting mode for detecting the back electromotive force.

3. When the motor controller 10 enables that the fifth transistor 105 and the sixth transistor 106 are turned off to form the floating phase, the floating phase is formed in the third coil L3. If the three-phase motor M is operated at a full speed, the motor controller 10 may enable that the first transistor is fully turned on and the second transistor is turned off. That is, the first transistor is operated in a saturation region. At this moment the motor controller 10 may enable that the third transistor 103 is turned off and the fourth transistor 104 is partially turned on. As shown in FIG. 2, the motor controller 10 may detect the zero point of the back electromotive force by comparing the voltage of the third terminal W with the voltage of the sixth terminal COM during the floating phase time interval. Therefore, when the motor controller 10 starts the floating phase for detecting the phase switching time point, the motor controller 10 may not need to start the ON time detecting mode or the OFF time detecting mode for detecting the back electromotive force.

According to one embodiment of the present invention, the motor controller 10 may be applied to a brushless direct current motor system. Moreover, the motor controller 10 may be applied to the high voltage configuration and the high frequency configuration. When the motor controller 10 starts the floating phase for detecting the phase switching time point, the motor controller 10 may be operated in the voltage lock mode or the current lock mode, such that an voltage of an output terminal within the switch circuit 100 is greater than the ground voltage and the voltage of the output terminal is less than the input voltage. Based on the above disclosed technology, the motor controller 10 may reduce switching noise of the three-phase motor M and increase the success rate of switching phases.

While the present invention has been described by the preferred embodiments, it is to be understood that the invention is not limited to the disclosed embodiments. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller, wherein the motor controller is configured to drive a three-phase motor, and the motor controller comprising:
   a switch circuit, coupled to the three-phase motor, wherein the switch circuit comprises a first transistor, a second transistor, a third transistor, a fourth transistor, a fifth transistor, a six transistor, a first terminal, a second terminal, and a third terminal, the first transistor and the second transistor are coupled to the first terminal, the third transistor and the fourth transistor are coupled to the second terminal, and the fifth transistor and the sixth transistor are coupled to the third terminal;
   a driving circuit, configured to generate a plurality of control signals to control the switch circuit; and
   a pulse width modulation circuit, configured to generate a pulse width modulation signal to the driving circuit, wherein the pulse width modulation signal has a duty cycle, and when the motor controller starts a floating phase for detecting a phase switching time point, the motor controller enables that the first transistor is partially turned on.

2. The motor controller of claim 1, wherein the motor controller enables that the second transistor is partially turned on.

3. The motor controller of claim 1, wherein the motor controller enables that the third transistor is turned off.

4. The motor controller of claim 1, wherein the motor controller enables that the third transistor is partially turned on.

5. The motor controller of claim 1, wherein the motor controller enables that the fourth transistor is partially turned on.

6. The motor controller of claim 1, wherein the motor controller enables that the fourth transistor is fully turned on.

7. The motor controller of claim 1, wherein the motor controller enables that the fifth transistor and the sixth transistor are turned off.

8. The motor controller of claim 1, wherein the motor controller modulates an ON resistance of the first transistor and an ON resistance of the second transistor.

9. The motor controller of claim 1, wherein the motor controller does not need to start an ON time detecting mode or an OFF time detecting mode for detecting a back electromotive force.

10. The motor controller of claim 1, wherein the motor controller is applied to a brushless direct current motor system.

11. The motor controller of claim 1, wherein the motor controller is applied to a high voltage configuration.

12. The motor controller of claim 1, wherein the motor controller is applied to a high frequency configuration.

13. The motor controller of claim 1, wherein the motor controller is configured to reduce switching noise of the three-phase motor.

14. The motor controller of claim 1, wherein the motor controller is configured to increase a success rate of switching phases.

15. The motor controller of claim 1, wherein the switch circuit further comprises a fourth terminal and a fifth terminal, the first transistor, the third transistor, and the fifth transistor are coupled to the fourth terminal, the second transistor, the fourth transistor, and the sixth transistor are coupled to the fifth terminal, and the motor controller detects a zero point of a back electromotive force by comparing a voltage of the third terminal with a voltage of a sixth terminal during a floating phase time interval.

16. A motor controller, wherein the motor controller is configured to drive a three-phase motor, and the motor controller comprising:
   a switch circuit, coupled to the three-phase motor for driving the three-phase motor;
   a driving circuit, configured to generate a plurality of control signals to control the switch circuit; and
   a pulse width modulation circuit, configured to generate a pulse width modulation signal to the driving circuit, wherein the pulse width modulation signal has a duty cycle, and when the motor controller starts a floating phase for detecting a phase switching time point, the motor controller enables that at least one transistor within the switch circuit is operated in a linear region.

17. The motor controller of claim 16, wherein the motor controller is applied to a high voltage configuration.

18. The motor controller of claim 16, wherein the motor controller is applied to a high frequency configuration.

19. The motor controller of claim 16, wherein the motor controller is configured to reduce switching noise of the three-phase motor.

20. The motor controller of claim 16, wherein the motor controller is configured to increase a success rate of switching phases.

21. The motor controller of claim 16, wherein the motor controller does not need to start an ON time detecting mode or an OFF time detecting mode for detecting a back electromotive force.

22. A motor controller, wherein the motor controller is configured to drive a three-phase motor, and the motor controller comprising:
   a switch circuit, coupled to the three-phase motor for driving the three-phase motor;
   a driving circuit, configured to generate a plurality of control signals to control the switch circuit; and
   a pulse width modulation circuit, configured to generate a pulse width modulation signal to the driving circuit, wherein the pulse width modulation signal has a duty cycle, and when the motor controller starts a floating phase for detecting a phase switching time point, the motor controller enables that a voltage of an output terminal within the switch circuit is greater than a ground voltage and the voltage of the output terminal is less than an input voltage.

23. The motor controller of claim 22, wherein the input voltage is a power supply voltage.

24. The motor controller of claim 22, wherein the motor controller enables that at least one transistor within the switch circuit is operated in a linear region.

25. The motor controller of claim 22, wherein the motor controller is applied to a high voltage configuration.

26. The motor controller of claim 22, wherein the motor controller is applied to a high frequency configuration.

27. The motor controller of claim 22, wherein the motor controller is configured to reduce switching noise of the three-phase motor.

28. The motor controller of claim 22, wherein the motor controller is configured to increase a success rate of switching phases.

29. The motor controller of claim 22, wherein the motor controller does not need to start an ON time detecting mode or an OFF time detecting mode for detecting a back electromotive force.

30. A motor controller, wherein the motor controller is configured to drive a three-phase motor, and the motor controller comprising:
   a switch circuit, coupled to the three-phase motor for driving the three-phase motor;
   a driving circuit, configured to generate a plurality of control signals to control the switch circuit; and
   a pulse width modulation circuit, configured to generate a pulse width modulation signal to the driving circuit, wherein the pulse width modulation signal has a duty cycle, and when the motor controller starts a floating phase for detecting a phase switching time point, the motor controller is operated in a voltage lock mode or a current lock mode.

31. The motor controller of claim 30, wherein when the motor controller is operated in the voltage lock mode, the motor controller enables that a voltage of an output terminal within the switch circuit is locked at a specific voltage, and the specific voltage is relevant to the duty cycle.

32. The motor controller of claim 31, wherein when the duty cycle increases, the specific voltage increases.

33. The motor controller of claim 30, wherein when the motor controller is operated in the current lock mode, the motor controller enables that a current flowing through an output terminal within the switch circuit is locked at a specific current, and the specific current is relevant to the duty cycle.

34. The motor controller of claim 33, wherein when the duty cycle increases, the specific current increases.

35. The motor controller of claim 30, wherein the motor controller enables that at least one transistor within the switch circuit is operated in a linear region.

36. The motor controller of claim 30, wherein the motor controller is applied to a high voltage configuration.

37. The motor controller of claim 30, wherein the motor controller is applied to a high frequency configuration.

38. The motor controller of claim 30, wherein the motor controller is configured to reduce switching noise of the three-phase motor.

39. The motor controller of claim 30, wherein the motor controller is configured to increase a success rate of switching phases.

40. The motor controller of claim 30, wherein the motor controller does not need to start an ON time detecting mode or an OFF time detecting mode for detecting a back electromotive force.

* * * * *